United States Patent
Sistrunk et al.

(10) Patent No.: US 10,149,493 B2
(45) Date of Patent: Dec. 11, 2018

(54) FLOURS THAT IMPROVE THE CRISPNESS OF BATTERED POTATOES

(71) Applicant: CORN PRODUCTS DEVELOPMENT, INC., Sao Paulo (BR)

(72) Inventors: Callen Sistrunk, Sparta, NJ (US); Yuechao Du, Somerset, NJ (US)

(73) Assignee: Corn Products Development, Inc., Westchester, IL (US)

( * ) Notice: Subject to any disclaimer, the term of this patent is extended or adjusted under 35 U.S.C. 154(b) by 0 days.

(21) Appl. No.: 14/698,915

(22) Filed: Apr. 29, 2015

(65) Prior Publication Data

US 2017/0202257 A1     Jul. 20, 2017

(51) Int. Cl.

| | |
|---|---|
| A21D 13/045 | (2017.01) |
| A21D 13/047 | (2017.01) |
| A23L 19/10 | (2016.01) |
| A21D 2/36 | (2006.01) |
| A23L 19/18 | (2016.01) |
| A23P 20/10 | (2016.01) |
| A23L 29/225 | (2016.01) |
| A21D 2/26 | (2006.01) |
| A23L 5/10 | (2016.01) |
| A23L 3/36 | (2006.01) |

(52) U.S. Cl.
CPC ............ *A23L 19/105* (2016.08); *A21D 2/266* (2013.01); *A21D 2/362* (2013.01); *A21D 2/366* (2013.01); *A21D 13/045* (2017.01); *A21D 13/047* (2017.01); *A23L 3/36* (2013.01); *A23L 5/11* (2016.08); *A23L 5/15* (2016.08); *A23L 19/18* (2016.08); *A23L 29/225* (2016.08); *A23P 20/105* (2016.08); *A23V 2002/00* (2013.01); *A23V 2200/20* (2013.01)

(58) Field of Classification Search
CPC ........................... A21D 13/045; A21D 13/047
See application file for complete search history.

(56) References Cited

U.S. PATENT DOCUMENTS

| | | | |
|---|---|---|---|
| 3,582,357 A | 6/1971 | Katz | |
| 3,620,763 A | 11/1971 | Hans | |
| 4,294,864 A | 10/1981 | Kulp et al. | |
| 5,718,770 A | 2/1998 | Shah et al. | |
| 5,932,017 A | 8/1999 | Chiu et al. | |
| 6,216,376 B1 | 4/2001 | Alvern | |
| 8,512,779 B2 | 8/2013 | Serpelloni | |
| 2005/0048172 A1 | 3/2005 | Vattem et al. | |
| 2005/0158429 A1 | 7/2005 | Serpelloni | |
| 2007/0087107 A1 | 4/2007 | Borders et al. | |
| 2007/0178218 A1 | 8/2007 | Yager et al. | |
| 2008/0003331 A1 | 1/2008 | Zhao et al. | |
| 2012/0095595 A1 | 4/2012 | Krishnan | |
| 2013/0337118 A1 | 12/2013 | Sistrunk et al. | |

FOREIGN PATENT DOCUMENTS

| | | |
|---|---|---|
| GB | 343193 | 2/1931 |
| GB | 2474838 | 5/2011 |
| IN | 212539 | 12/2007 |
| WO | WO20002882 A1 | 5/2000 |

OTHER PUBLICATIONS

Osman Kiincceker, et al, Edible Effects on Fried Potato Balls, Food Bioprocess Technology(2012), vol. 5, pp. 1349-1454, Springer Science & Business Media, LLC.
S.Emani et al., Processing of Starch-Rich and Protein-Rich Fractions From ChickPeas—A Review, "The Society for Engineering in Agricultural, Food and Biological Systems", Presented at 2002 ASAE/CSAE North-Central Intersectional Meeting, Sep. 27-28, 2002, Paper No. MBSK 02-212, ASAE.
Tany Der, Pulse Canada Webinar: "Pulse Ingredients in Food Applications", Dec. 8, 2011.
Bijoy Moktan et al., "Antioxidant Activities of Cereal-Legume Mixed Batters as Influenced by Process Parameters During Preparation of Dholkla and Idli, Traditional Steamed Pancakes",International Journal of Food Sciences and Nutrition V62(4), p. 360-369 (2011).
Agnes Osei-Yaw et al., "Batter Properties of Yellow Pea Flour With Respect to Akla Preparation", Cereal Chemistry, V63(6), p. 506-511 (1986).
Kihncceker, O. et al. "Effects of Chickpea ( *Cicer arietinum*) Flour on Quality of Deep-fat Fried Chicken Nuggets", Journal of Food, Agriculture & Environment V8(2), p. 47-50 (2010), WFL Publ, Meri-Rastilantie 3 C, Helsinki, FI-00980, Finland.
Anon. "Innovative Coatings", Prepared Foods V. 178 (8), p. 68 (2009).
Aachary A.A. et al, "Short Chain Xylooligosaccharides: A Potential Prebiotic Used to Improve Batter Fermentation and Its Effect on the Quality Attributes of Idli, a Cereal-legume-based Indian Traditional Food", International Journal of Food Science & Technology, V 46, p. 1346-1355 (2011).
Angioloni, A. et al., "Impact of High Hydrostatic pressure on Protein Aggregation and Rheological Properties of Legume Batters", V. 6, p. 3576-3584 (2013).

*Primary Examiner* — Jenna A Watts

(74) *Attorney, Agent, or Firm* — Jacqueline Cohen; Jason Grauch

(57) ABSTRACT

The application relates to a composition comprising separately by weight:
a) from about 25% to about 50% by weight of a native rice flour;
b) from about 5% to about 15% by weight of a rice flour which has been heat-moisture treated;
c) from about 10% to about 20% of a flour which has been thermally inhibited; and
d) from about 15% to about 35% of a reduced protein pulse flour selected from the group consisting of pea flour, faba bean flour, lentil flour, chickpea flour, and mixtures thereof.

13 Claims, No Drawings

FLOURS THAT IMPROVE THE CRISPNESS OF BATTERED POTATOES

BACKGROUND OF THE INVENTION

The incorporation of low levels of tapioca dextrins into starch enrobing slurries is known in a variety of forms including as pure compositions (NATIONAL™ 0280 or CRYSTAL TEX™ 644 dextrin, Ingredion Incorporated) and as blends with high amylose starches (Crisp Coat® UC brand crisping agent, Ingredion Incorporated). The crispness of the enrobed food after frying is determined by several factors including the cook-out of the starch and/or flour, the moisture balance between the starch and/or flour solution surface and inside of the food, the thickness of the coating layer, and the interaction of ingredients in the enrobing slurry. The coating forms a discontinuous film which lets the moisture from the inside of the food escape or vent out, but will not absorb significant amounts of moisture into the coating layer. There is a trend in the food industry to provide "all natural" battered and breaded foods. In order to achieve this objective, chemically modified starch and dextrin may not be used. Chemically modified starches can be replaced by thermally modified alternatives. However, no effective alternative had been found in the past to replace the dextrin in fry coatings to provide an enhanced crisping effect.

Woerman et al. in U.S. Pat. No. 5,750,168 issued May 12, 1998 teach aqueous starch enrobing slurries comprising not less than 30% by weight ungelatinized cross-linked tapioca starch, a rice flour component at a solids concentration of from about 10% to about 25% by weight, and which is substantially free of corn starch. Thomas et al. in U.S. Pat. No. 6,221,420 B1, issued Apr. 24, 2001 show a thermally inhibited, waxy maize starch and thermally inhibited, waxy rice flour in a 25% fat salad dressing. Wong et al. in U.S. Pat. No. 7,223,433 B2 issued May 29, 2007 teach a flour/starch blend for preparing stuffed rolls wrappers comprising from 48% to 52% of high amylose rice starch, from 31% to 36% of high amylose rice flour, from 8% to 12% of potato starch, from 4% to 7% of modified tapioca starch, and from 0.2 to 2% of pregelatinized wheat flour. Rogels et al. in Patent Application Publication No. US 2001/0004463 A1, dated Jun. 21, 2001 describe a fry coating composition comprising ungelatinized starch and not less than 50% of rice flour. Scavone et al. in Patent Application Publication No. US 2001/0055637 A1, dated Dec. 27, 2001 describe a coating for potato strips comprising cross-linked potato starch (39.245 wt %), high amylose corn starch (30.83 wt %), tapioca dextrin (13.215 wt %), and rice flour (15.0 wt %). Brown et al. in Patent Application Publication No. US 2006/0025382 A1, dated Feb. 2, 2006 teach an extruded breakfast cereal containing 43% modified maize starch, 11.5% rice flour, 11.5% oat flour, and 20.4% wheat flour. Villagran et al. in Patent Application Publication No. US 2006/0286271 A1, dated Dec. 21, 2006, teach a rice flour composition having from about 20% to about 95%, by weight, of a rice flour and from about 5% to about 80%, by weight, of rice starch material. DeStafeno in Patent Application Publication No. US 2009/0181147 A1, dated Jul. 16, 2009, teaches a dry mix for gluten-free baked goods comprised of approximately ½ part rice flour, ⅛ part tapioca starch, and ⅛ part corn starch. Foo et al. in Patent Application Publication No. US 2011/0151094 A1, dated Jun. 23, 2011, teach a rice-based food product having a reduced GI value comprising mixing rice flour and tapioca starch to form a dry mix. Sistrunk et al. in Patent Application Publication No. US 2013/0337118, dated Dec. 19, 2013, discloses a coating composition for battered and breaded foods composition comprising separately by weight: from about 20% to about 70% of non-gelatinized starch, from about 5% to about 40% of rice flour, from about 5% to about 30% of high amylose corn starch, and from about 5% to about 40% of flour or starch, which has been heat moisture treated or thermally inhibited.

SUMMARY OF THE INVENTION

In one aspect, this invention provides a composition comprising separately by weight:
a) from about 25% to about 50% of a native rice flour;
b) from about 5% to about 15% of a rice flour which has been heat-moisture treated;
c) from about 10% to about 20% of a flour which has been thermally inhibited; and
d) from about 15% to about 35% of a reduced protein pulse flour.

In one aspect the reduced protein pulse flour is selected from the group consisting of pea flour, faba bean flour, lentil flour, chickpea flour, and mixtures thereof.

In another aspect, the invention provides an enrobing solution comprising a minor amount by weight (e.g. one part by weight) of a composition comprising separately by weight:
a) from about 25% to about 50% of a native rice flour;
b) from about 5% to about 15% of a rice flour which has been heat-moisture treated;
c) from about 10% to about 20% of a flour which has been thermally inhibited; and
d) from about 15% to about 35% of a reduced protein pulse flour; and a major amount by weight (e.g. from about one part to about two parts by weight) of water. In one aspect the reduced protein pulse flour is selected from the group consisting of pea flour, faba bean flour, lentil flour, chickpea flour, and mixtures thereof.

In one embodiment, the enrobing solution comprises 1 part by weight of a dry solids coating mix as described above and from about 1.2 parts to about 1.6 parts by weight of water.

In one aspect, the invention provides an enrobed potato product prepared with an enrobing solution comprising a minor amount by weight (e.g. one part by weight) of a composition comprising separately by weight:
a) from about 25% to about 50% of a native rice flour;
b) from about 5% to about 15% of a rice flour which has been heat-moisture treated;
c) from about 10% to about 20% of a flour which has been thermally inhibited; and
d) from about 15% to about 35% of a reduced protein pulse flour; and a major amount by weight (e.g. from about one part to about two parts by weight) of water. In one aspect the reduced protein pulse flour is selected from the group consisting of pea flour, faba bean flour, lentil flour, chickpea flour, and mixtures thereof.

In one embodiment, the enrobed potato product comprises regular potato.

In one embodiment, the enrobed potato product comprises sweet potato.

In one embodiment, the enrobed potato product is then par fried.

In one embodiment, the enrobed potato product is then frozen.

In one embodiment, the enrobed potato product is then baked.

In one embodiment, the enrobed potato product is then, in any sequence, par fried, frozen, and baked.

In one aspect, this invention provides a process for preparing a frozen potato product with a film-like coating on the outer surface, which comprises cutting raw potatoes; blanching the potatoes; partially drying the potatoes; coating the potatoes with the aqueous enrobing composition as described above; followed by par frying the potatoes in hot oil; and freezing the potatoes.

In one aspect, the invention provides a composition comprising separately by weight:
a) from about 35% to about 40% of a native rice flour;
b) from about 7% to about 15% of a rice flour which has been heat-moisture treated;
c) from about 12% to about 20% of a flour which has been thermally inhibited; and
d) from about 20% to about 30% of a reduced protein pulse flour selected from the group consisting of pea flour, faba bean flour, lentil flour, chickpea flour, and mixtures thereof.

DETAILED DESCRIPTION OF THE INVENTION

The components of the invention are flours. A flour is obtained from the native source using methods known in the art for producing flour, for example by dry milling. Other possible methods include, without limitation, wet grinding and separation or a combination of dry and wet procedures. One skilled in the art understands that the components of the flour may be manipulated; for example, the protein content of flour may be increased by known techniques, such as fine grinding and air classification.

The compositions of the invention are comprised of a reduced protein pulse flour. By "pulses" is meant dried peas, dried beans, chickpeas, and lentils. Preferred pulses are peas, faba beans, chickpeas, and lentils. By reduced protein is meant that the pulse flour has been processed to remove a portion of the native protein, typically at least about a 5% by weight reduction in protein content, and more typically at least about a 10%, and even more typically at least about 20% reduction in protein content. For example, by a 10% reduction in protein content, it is meant that if the native flour has a protein content of 20% by weight, then the reduced protein flour has 18% protein by weight. Typical reduced protein pulse flours will have from about 10% reduction to about 50% reduction, more typically about a 20% to about 40% protein reduction. The protein content of the reduced protein pulse flour will typically range from about 8% to about 22%, more typically from about 10% to about 18% and even more typically from about 12% to about 16%, by weight.

Processes for obtaining such reduced protein pulse flours include air classification or wet processing of dehulled and milled pulse grains. Air classification is commonly used to produce protein concentrates in cereals and pulses. Flour particles produced by pin milling are different in their shape, size and density. Air classification differentiates the protein (fine fraction) and starch (coarse fraction) particles. The pin milled-flour is air classified in a spiral air stream and fractionated into light and heavy particles. The fine and light particles contain protein, whereas the coarse and heavier particles mostly contain starch granules. Therefore, opposing centrifugal force and density are employed to separate protein and starch granules. The starch granules are separated from the protein fractions centrifugally into a coarse fraction duct. Subsequently, the protein fraction, which is the fine fraction, is transferred into the air cyclone. Since some protein bodies still adhere to the starch granules at the end of pin milling, it is necessary to reprocess the coarse fraction by pin milling and air classification, resulting in increased protein yield. The starch-rich fractions contain 58.0-76.1% starch and 7.7-20.1% protein (depends on legume sources). The protein-rich fractions contain 49.3-75.1% protein and 0.0-4.6% starch. If starch fractions are remilled and air classified again, the yield of starch fraction and protein fraction will improve. The starch fractions in the second stage contain 71.0-85.9% starch and 4.0-10.4% protein, whereas the protein fractions contain 38.0-68.2% protein and 0.4-16.6% starch. This is a typical range of yield from legume sources.

The moisture content of legumes affects the fractionation yield of starch-rich and protein rich fractions by pin milling and air classification. Reduction in moisture content will lead to a reduction in starch fraction yield, protein content of the starch and protein fractions, and starch separation yield. On the contrary, protein fraction yield, starch content of the starch and protein fractions, protein separation yield, and neutral detergent fiber content of the protein fraction increase. The optimum moisture content range for fractionating the protein in pulses is between 7 and 9%. The lower the moisture content, the higher is the separation efficiency of protein. Air classification of lipid-rich legumes does not have high efficiency. The high oil content of chickpeas decreases air classification efficiency. The oil content of dehulled chickpeas ranges between 4.5 and 7.5%. This amount is unique among grain legumes. The air classification process separates more than 90% of the starch into the coarse fraction but the separation of protein in the fine fraction depends on the kind of air classifier and ranges between 19.2 and 50.2%. The fine fraction of pin milled-flours contains much of the lipid, ash and, to a lesser amount, crude fiber along with proteins. It has been demonstrated in the art that the C-E Bauer Centri-Sonic classifier (C-E Bauer, a subsidiary of Combustion Engineering, Inc., Springfield, Ohio) separates 50.2% of proteins into fine fraction effectively and 92.0% of starch into coarse fraction. It was shown that this classifier is effective for air classification of pin milled-flour of chickpeas. Wet Processing Protein from pulses can be prepared in three forms: flour, protein concentrate and protein isolate. Wet processing is used to prepare more highly purified protein and starch. However, a higher amount of energy is spent for drying and refining of the effluent in wet processing, making it difficult and costly. Protein concentrates and protein isolates (high protein concentration) from pulse grains can be prepared by wet processing. Wet processing is based on solubilization of protein followed by precipitation at isoelectric pH to recover proteins. Other methods under this process include 'salting out', 'hydrophobic out' and 'ultrafiltration'.

A component of this invention is a rice flour which has been heat-moisture treated. In preparing the rice flour which has been heat-moisture treated, it is necessary that the flour be processed at a specified total water content and defined temperature and time combination. This avoids or minimizes gelatinization of the starch component of the flour so that the starch substantially retains its granular structure (e.g., at least 90 wt % of the flour retains its granular structure). Slight gelatinization may occur, but should be minimized. In one embodiment, there is substantially no gelatinization.

The total water (moisture) content of the rice flour which has been heat-moisture treated will be in a range of from about 10% to about 50%, and in one embodiment in the range of from about 20% to about 30% by weight based on the weight of the dry flour (dry solids basis). Examples of such moisture contents include but are not limited to about 5%, about 10%, about 15%, about 20%, about 30% about 40%, about 50%, or any range between and/or including any two of these values. In one embodiment, this relative level of moisture is maintained substantially constant throughout the heating step. In another embodiment, no water is added to the flour during heating (i.e. no water is present during the heating step other than the moisture content of the flour). In another embodiment, the moisture content is not controlled (not kept substantially constant) during the heat-moisture treatment such that the treated flour has a lower moisture content once processed relative to that prior to processing.

In one embodiment, the rice flour which has been heat-moisture treated is heated at a target temperature of from 80° C. to about 160° C. In one embodiment, the flour of this application is heated at a target temperature of from 90° C. to about 140° C., and in one embodiment at a temperature from 100° C. to about 120° C. While the most desirable temperature and water content may vary depending on the particular flour composition (including the source and amount of protein, starch, and lipid) and its amylose content, it is important that the starch remain in the granular state such that it does not lose its crystalline and birefringent characteristics.

The time of heating the flour at the target temperature can vary depending on the flour used (source), its amylose content, the particle size, as well as the amount of moisture and the heating temperature. In one embodiment, such heating time will be from about 0.5 minutes to about 8 hours. In another embodiment, the heating time will be from about 0.5 minutes to about 2 hours. In another embodiment, the heating time will be from about 0.5 minutes to about 1 hour. In yet another embodiment, the heating time will be 0.5 to 15 minutes.

The heat-up (ramp) time may vary depending upon the equipment used, the process conditions, and the flour used. In one embodiment, it is desirable to have a short heat-up time to avoid color and adverse flavor formation in the resultant flour. In another embodiment, the heat-up time is less than 5 minutes and in another embodiment the heat up time is less than 1 minute.

The conditions for obtaining heat-moisture treated flour are such that the granular structure of the starch is not destroyed (gelatinized), retaining its crystalline and birefringent properties. Further, there should be no loss of any Maltese cross present in the native starch when the granular structure is viewed under polarized light. Under some conditions, such as at high moisture and high temperature, the starch granule may be partially swollen, but the crystallinity is not completely destroyed.

Although the crystallinity of the starch remains, the heat-moisture treating changes other components of the flour, which may include structural changes. In one aspect, the conditions of the heat-moisture treating are chosen to maximize the flour's efficacy in retorting, yet minimize the undesirable heat-induced effects, such as reduced nutritional value (e.g. degradation of vitamins) or reduced organoleptic qualities (e.g. undesirable taste, aroma, texture, or increased color).

The heat treatment may be conducted in any equipment known in the art, which provides sufficient capabilities for powder processing, as well as heating and, if desired, moisture addition and control, mixing, and/or drying. In one embodiment, the equipment is a continuous tubular thin film dryer. In another embodiment, the equipment is a combination of a continuous thin film dryer in series with a continuous heated conveyer screw, which may additionally be pressurized to control moisture content at the target temperature. In yet another embodiment, the equipment is a batch ploughshare mixer. The heat treatment may be done as a batch or as a continuous process.

In one embodiment, the heat treatment is conducted as a batch process and the flour is brought up to a temperature from about 80° C. to about 160° C. range and held at a substantially constant temperature. In another embodiment, the heat treatment is conducted as a continuous process, with a short (less than five minute) ramp-up time. In one embodiment of the continuous process, the flour is brought up to a temperature from about 80° C. to about 160° C. range and held at a substantially constant temperature and in another embodiment, the heat treatment is substantially complete by the time such temperature is reached.

Another component of the invention is flour which has been thermally inhibited. The flours used in preparing the thermally may be derived from any native source. A native flour is suitable. Also suitable are flours derived from a plant obtained by standard breeding techniques including cross-breeding, translocation, inversion, transformation, insertion, irradiation, chemical or other induced mutation, or any other method of gene or chromosome engineering to include variations thereof. In addition, flour derived from a plant grown from induced mutations and variations of the above generic composition which may be produced by known standard methods of mutation breeding are also suitable herein.

Typical sources for the flours of this application are cereals, tubers, roots, legumes and fruits. The native source can include corn (maize), pea, potato, sweet potato, banana, barley, wheat, rice, sago, amaranth, tapioca, arrowroot, canna, or sorghum, as well high amylopectin or high amylose varieties thereof. Preferred thermally inhibited flour will be derived from tapioca, corn, sorghum, potato or wheat.

An example of the methods of thermal inhibition that will be useful to produce the thermally inhibited flour are found in U.S. Pat. No. 6,261,376 (Jeffcoat, et al.), the disclosure of which is incorporated herein by reference in its entirety. The thermal inhibition process of the '376 patent comprises the steps of (a) optionally pH adjusting a granular flour to a pH of about 7.0 or above; (b) dehydrating the flour until it is anhydrous or substantially anhydrous; and (c) heat treating the dehydrated flour at a temperature and for a period of time sufficient to inhibit, the flour and preferably render it non-cohesive. As used herein, "substantially anhydrous" means containing less than 1% moisture by weight.

Typically, the flour is slurried in water, optionally the pH is adjusted to neutral or greater by the addition of a base, and the starch is dried to about 2-15% moisture. The dried flour is then thermally inhibited by dehydrating the flour to anhydrous or substantially anhydrous and then heat treating the dehydrated flour.

The dehydration may be a thermal dehydration or a non-thermal dehydration. The thermal dehydration is carried out by heating the flour in a convention oven or a microwave oven, or any other heating device for a time and at a temperature sufficient to reduce the moisture content to less than 1%, preferably 0%. Examples of non-thermal dehydrating methods include extracting the water from the flour using a hydrophilic solvent such as an alcohol (e.g., ethanol) or freeze drying the flour.

The typical pH is at least 7, most typically greater than pH 8, more typically pH 7.5-10.5, and even more typically pH 8-9.5. At a pH above 12, gelatinization more easily occurs; therefore, pH adjustments below 12 are more effectual.

Buffers, such as sodium phosphate, may be use to maintain pH if needed. An alternative method of raising the pH consists of spraying a solution of a base onto a flour until the flour attains the desired pH, either during or prior to the thermal inhibition steps. Another method consists of infusing etc. It should be noted that the textual and viscosity benefits of the thermal inhibition process tend to be enhanced as the pH is increased, although higher pHs tend to increase browning of the starch during the heat treating step.

After the flour is dehydrated, it is heat treated for a time and at a temperature, or range of temperatures, sufficient to inhibit the flour. The preferred heating temperatures are greater than 100° C. For practical purposes, the upper limit of the heat treating temperature is usually 200° C., at which temperature highly inhibited flours can be obtained. Typically the heat treating is carried out at 120°-160° C., more typically 140°-150° C. The level of inhibition is dependent on the pH and heating temperature and time. For example, if the flour is adjusted to pH 9 and the oven temperature is 140° C., a lightly inhibited flour will require about 3-4 hours of heating, a moderately inhibited flour will require about 4-5 hours of heating, and a highly inhibited flour will require 5-6 hours of heating. For lower temperatures, longer heating times are required. When the flour is at a lower pH, as with a native starch which has a pH of about 5.0-6.5, the heating will provide less inhibition.

When the flour is thermally dehydrated, the dehydrating and heat treating steps can be continuous and can be accomplished by the application of heat to the flour beginning from ambient temperature. When a fluidized bed is used, the moisture will be driven off and the flour will-be anhydrous before the temperature reaches about 125° C. After the flour is anhydrous or substantially anhydrous and while the heating is continued, some level of inhibition will be attained before, simultaneously, or even the final heat treating temperature is reached.

The thermal dehydrating and heat treating steps may be performed at normal pressures, under vacuum or under pressure, and may be accomplished using any means known in the art. The preferred method is by the application of dry heat in air or in an inert gaseous environment The thermal dehydrating and heat treating apparatus can be any industrial oven, for example, conventional ovens, microwave ovens, dextrinizers, fluidized bed reactors and driers, mixers and blenders equipped with heating devices and other types of heaters, provided that the apparatus is fitted with a vent to the atmosphere so that moisture does not accumulate and precipitate onto the flour. The preferred apparatus is a fluidized bed. Preferably, the apparatus is equipped with a means for removing water vapor, such as, a vacuum or a blower to sweep air or the fluidizing gas from the head-space of the fluidized bed. Suitable fluidizing gases are air and nitrogen. For safety reasons, it is preferable to use a gas containing less than 12% oxygen.

The present invention provides improved aqueous coatings which provide improved crispness and other physical properties to coated potato product products such as regular potato or sweet potato fries in the absence of a dextrin component. As one aspect of the present application, coatings have been found that provide various improved properties to the resulting potato fries which they are used to coat. Specifically it has been found that unexpected crispness can be obtained in regular potato or sweet potato fry coating compositions without dextrin by using aqueous coating having an as-is solids content comprising:

a) from about 25% to about 50% of a native rice flour;
b) from about 5% to about 15% of a rice flour which has been heat-moisture treated;
c) from about 10% to about 20% of a flour which has been thermally inhibited;
d) optionally, up to about 10% of a native tapioca flour; and
e) from about 15% to about 35% of a reduced protein pulse.

This invention provides a coating which provides improved crispness and other physical properties to food pieces such as meat, poultry, fish, and vegetables. One aspect of the present application is to improve the crispiness of a French fry coating. It has been found that improved crispness can be obtained in a potato fry coating having an as-is solids content as described above.

This coating typically contains a blend of flours as described above; salt (typically about 2-4% by weight); leavening (typically sodium bicarbonate at 0.5-2% by weight); dextrose (typically 0.5-2% by weight); and, optionally, xanthan gum.

The invention further provides processes for preparing a frozen potato product with a film-like coating on the outer surface and the products so produced, which comprises cutting the raw potatoes; blanching the potatoes; partially drying the potatoes; coating the potatoes with the aqueous enrobing solutions of the application; followed by par frying the potatoes in hot oil; and freezing the potatoes.

The invention further provides a dry coating mix for coating the outer surface of a potato product having an as-is solids content as described above.

The invention further provides methods of producing such a dry coating mix comprising blending:

a) from about 25% to about 50% of a native rice flour;
b) from about 5% to about 15% of a rice flour which has been heat-moisture treated;
c) from about 10% to about 20% of a flour which has been thermally inhibited; and
d) from about 15% to about 35% of a reduced protein pulse flour. In one aspect the reduced protein pulse flour is selected from the group consisting of pea flour, faba bean flour, lentil flour, chickpea flour, and mixtures thereof.

Processes for the production of frozen regular potato and sweet potato fries are well known and include the basic steps of preparing raw potatoes by washing, peeling, and cutting into appropriately shaped pieces. The resulting potato strips are then blanched according to conventional methods in order to inactivate enzymes in the potato and to leach sugars from the surface of the potato strip. In one embodiment, the blanched potato strips are treated in a brine solution containing about 0.75% sodium acid pyrophosphate (SAPP). After these steps, the potato strips are then subjected to a drying step to reduce the moisture present in the strips.

The strips are then coated with the aqueous enrobing solution of the invention. After blending of the solid ingredients with a desired amount of water to produce the sweet potato fry enrobing solution, the enrobing solution may be applied to coat the cut potato strips with a coating pickup of from about 8% to about 30%. In one embodiment, the coating pickup is from about 12% to about 18%. In one embodiment, the coating pickup is about 15%, (based on coated potato strips weight).

After coating with the aqueous enrobing solution, the potato strips are drained and par fried at a temperature of from about 182° C. to about 199° C. for a time period from about 40 seconds to about 90 seconds. Par frying serves to gelatinize the starch of the potato strips and of the coating and removes moisture from the inside of the potato strip.

The potato strips are then frozen, packaged, and in one embodiment stored at a temperature below −18° C. until they are prepared for final consumption. In order to prepare the potato strips for consumption, they are cooked either by frying or by baking in an oven. After such preparation, potato strips prepared according to the invention are characterized by a crisp outer layer and a moist tender interior.

Optional ingredients for use in providing the coating compositions of the invention include native tapioca flour (up to about 10%, more typically up to about 5%, by weight), maltodextrins, microcrystalline cellulose, hydrocolloids, gums including xanthan gum or guar gum, or the like which are used to provide improved structure and keeping qualities to the coated potato products. Maltodextrins are used in one embodiment at solids concentrations of up to 6%. Maltodextrins useful with the invention may be derived from any type of starch including tapioca, potato, or corn starch and include those characterized by having a DE in the range from 2 to 7. In one embodiment, the maltodextrins has a DE of about 5. In one embodiment, gum blends are incorporated into the compositions of the invention at solids concentrations of less than 0.15% gum by weight.

In one embodiment, the compositions of the invention are essentially gluten-free. In one embodiment, the compositions are essentially dextrin-free. In one embodiment, the compositions are essentially high-amylose free.

Leavening agents in the form of baking powders may also be incorporated into the compositions of the invention in order to open up the structure of the coating batters upon cooking and release moisture from the French fry products without blowing off the coating layer. Suitable baking powders include sodium bicarbonate plus one or more leavening acids such as sodium aluminum phosphate (SALP), sodium aluminum sulfate (SAS), sodium acid pyrophosphate (SAPP), dicalcium phosphate (DCP), or anhydrous monocalcium phosphate (AMCP). The combination of sodium bicarbonate and SAPP is one embodiment. Such leavening agents are, in one embodiment, added at sodium bicarbonate concentrations from about 0.9 parts soda to about 1.1 parts SAPP.

The compositions of the invention may include protein components such as sodium caseinate, nonfat dry milk, soy, whey, or dried egg whites. Such proteins interact with the carbohydrates in the coating compositions to increase film strength, provide structure, improve crispness, and prolong holding of crispness. The compositions of the invention may include carbohydrate components such as microcrystalline cellulose or the like. Still other optional ingredients may also be incorporated into the coating compositions of the invention including salt, flavorings, seasonings, or browning agents such as whey or dextrose.

In one embodiment, the coating composition of the invention is essentially gluten-free. In one embodiment, the coating composition is essentially dextrin-free. In one embodiment, the coating composition is essentially high-amylose free.

In one embodiment, the potato fry aqueous enrobing solution is prepared by dry blending of the various solid ingredients. Water is then slowly added to the dry ingredients in an amount selected to provide an appropriate viscosity to the coating batter. In one embodiment, aqueous slurries containing from about 1.2 parts to about 1.6 parts by weight of water to 1 part by weight of the solid ingredients have a satisfactory viscosity for coating the potato strips. The ungelatinized starches do not substantially contribute to the viscosity of the solution. In another embodiment, the potato fry aqueous enrobing solution is prepared by adding a dry blend of the various solid ingredients to water. In another embodiment, the potato fry aqueous enrobing solution is prepared by adding the various solid ingredients, either one at a time or in combinations, to water.

Controlling moisture migration is important to maintaining the crispness of the potato fries during holding prior to consumption. The coating may, in one embodiment, be somewhat brittle, which gives a clean bite with minimum toughness. There is a fine balance between all the ingredients in the coating formula to achieve crispness and keeping quality with the method used to process the potato strips contributing to the crispness of the potato fries. It is further contemplated that the improved properties provided by the solids making up the enrobing solutions of the invention may also be provided when the solids ingredients making up the solutions are applied to potato products in a non-aqueous solution form such as by dusting.

Definitions

The following definitions are used in connection with the compounds of the present invention unless the context indicates otherwise. Enrobed potato product is potato product coated or encased or sealed by something. The acronym DE means dextrose equivalent. The phrase "as-is solids content" refers to a solids content for a composition assuming a water concentration in the starch or flour components of about 12% by weight.

As used herein the terms "major" and "minor" as applied to amounts are relative terms, with "major" meaning a greater amount and "minor" meaning a lesser amount.

As used herein the terms "potato" and "potato product", without more, include both regular potatoes and sweet potatoes.

As used herein, the term "dextrin" means the products made by heating dry starch with or without acid. During the reaction, greater or lesser amounts of hydrolysis; transglycosidation, and repolymerization occur. According to which reaction predominates, the product is a white dextrin, a yellow dextrin, or a British gum. As used herein, the term "dextrin-free" means less than about 0.1% dextrin, less than about 0.05% dextrin, less than about 0.01% dextrin, or essentially 0% dextrin.

As used herein, the term "gluten" means the protein found in wheat. As used herein the term "gluten-free" means the composition contains essentially 0% by weight wheat gluten.

As used herein, the phrase "heat moisture treatment" means a process in which a subject is heated by using, as a heating medium, saturated steam or hot water in a high-humidity atmosphere, for example, an atmosphere of at least 60% humidity. The subject to be heated may be brought into direct contact with the heating medium or the subject may be brought into indirect contact with the heating medium like an indirect heating system, for example, in an atmosphere of at least 60% humidity may be performed. The heat moisture treatment of native starch causes an irreversible modification of the semi-crystalline structure, which changes from an ordered state to a disordered state, resulting in gelatinization. The gel thus formed is not stable and after a few days the starch restructures itself into a more ordered structure, this phenomenon being known as retrogradation. The physical characteristics of starches are modified by heat moisture treatment without change in their granular appearance. These changed characteristics include change in equilibrium moisture content, change in X-ray diffraction pattern, change in the swelling power of starch granules, and increase in the gelatinization temperature. The heat-moisture treated rice flour can be prepared as described in US Patent Application Publication No 2014/0287130, published Sep. 25, 2014, the disclosure of which is incorporated herein by reference.

As used herein, the term "high amylose" includes a starch or flour containing at least 40% amylose by weight. As used herein, the phrase, "comprising separately" means each of the following items must be included individually, no item can fill more than one of the roles, but the phrase does not exclude additional, unrecited elements. As used herein, the term "high amylose-free" means less than about 0.1% high amylose, less than about 0.05% high amylose, less than about 0.01% high amylose, or essentially 0% high amylose starch of flour.

As used herein, the phrase "inhibited flour or starch" means a flour or starch altered by physical or chemical treatment to give reduced gelatinization of starch in hot water and/or greater stability to acids and alkalis.

As used herein, the phrase "non-gelatinized starch" means a starch that has not been gelatinized. Starch gelatinization is a process that breaks down the intermolecular bonds of starch molecules in the presence of water and heat. Gelatinization irreversibly dissolves the starch granule, increases the randomness of the general granule structure, and decreases the number and size of crystalline regions. As the gelatinization proceeds, the starch loses its birefringence and its Maltese cross.

As used herein, the phrase "rice flour" means the product obtained by finely grinding grains of rice. The rice flour may be made from short grain rice, medium grain rice, long grain rice, white rice, brown rice, or any mixtures thereof.

As used herein, the phrase "thermally inhibited starch or flour" means a starch or flour subjected to a heat treatment process that results in the starch or flour becoming and remaining inhibited. A starch or flour is referred to as "inhibited" or "thermally inhibited" if these thermally inhibited starches or flours when dispersed and/or cooked in water exhibit the textural and viscosity properties characteristic of a chemically-cross-linked starch or flour. The starch granules are more resistant to viscosity breakdown. This resistance to breakdown results in what is subjectively considered a non-cohesive or "short" textured paste, meaning that the gelatinized starch or flour tends to be salve-like and heavy in viscosity rather than runny or gummy. The non-pregelatinized thermally inhibited granular starches or flours exhibit an unchanged or reduced gelatinization temperature. In contrast, most annealed and heat/moisture treated starches or flours show an increased gelatinization temperature. Chemically cross-linked starch or flours show an unchanged gelatinization temperature. It is believed the overall granular structure of the thermally inhibited starches has been altered. The starches that are substantially completely thermally inhibited will resist gelatinization. The starches that are highly inhibited will gelatinize to a limited extent and show a continuing rise in viscosity but will not attain a peak viscosity. The starches that are moderately inhibited will exhibit a lower peak viscosity and a lower percentage breakdown in viscosity compared to the same starch that is not inhibited. The starches that are lightly inhibited will show a slight increase in peak viscosity and a lower percentage breakdown in viscosity compared to the same starch that is not inhibited. For non-pregelatinized thermally inhibited starches, the Brabender viscosity initializes (starts to build) at an earlier or substantially the same time as the same starch which has not been thermally inhibited. In addition, the thermally inhibited starches will have less viscosity breakdown than the same starch which has not been thermally inhibited.

Starch or flour inhibition may be characterized by Brabender curves. For a highly inhibited starch or flour, the Brabender curve will be flat, indicating that the starch or flour is so inhibited that it is resisting any further gelatinization or the curve will be a rising Brabender curve, indicating that further gelatinization is occurring at a slow rate and to a limited extent. For a less inhibited starch or flour, the Brabender curve will show a dropping curve, but the overall breakdown in viscosity from the peak viscosity will be lower than that for a non-inhibited starch or flour. Thermally inhibited starches and methods for making them are known and described in U.S. Pat. Nos. 5,725,676, 5,932,01, or 6,231,675.

Throughout this application, various publications are referenced. The disclosures of these publications in their entireties are hereby incorporated by reference into this application in order to more fully describe the state of the art as known to those skilled therein as of the date of the application described and claimed herein.

It will be noted that the maximum percentages of each component of the blend as recited above do not total 100%. It will be appreciated by one of skill in the art that if it is desired to use relatively more of one component in a particular blend, then the amounts of each of the other components will be reduced in proportion such that the total percentages equal 100% and, likewise, if it is desired to use relatively less of one component in a particular blend, then the amounts of each of the other components will be increased in proportion such that the total percentages equal 100%. All parts and percentages herein are by weight unless otherwise noted in context.

EXAMPLES

Example 1

The following example demonstrates that reduced protein legume flour provided enhanced crispiness compared to regular legume flour and all-purpose wheat flour when used in a coating formulation for sweet potato fries.

The legume flour chosen for the following example is yellow pea flour. The regular yellow pea flour used in this experiment contained 22% protein, the reduced protein pea flour contained 14% protein and all-purpose wheat flour contained 10% protein. In this experiment, all ingredients remained the same in the formulation except for the all-purpose wheat flour and pulse flours. They were tested in the formulation at a level of 9.5% (wet basis), 24.3% (dry basis).

Formulations:
Batter (Wet Basis)

| Ingredients | All Purpose Wheat Flour - 10% Protein | Regular Yellow Pea Flour - 22% Protein | Reduced Protein Yellow Pea Flour - 14% Protein |
|---|---|---|---|
| Native Rice Flour | 14.8 | 14.8 | 14.8 |
| Heat-Moisture Treated Rice Flour[1] | 4.2 | 4.2 | 4.2 |
| Thermally Inhibited Tapioca Flour[2] | 6.3 | 6.3 | 6.3 |

-continued

| Ingredients | All Purpose Wheat Flour - 10% Protein | Regular Yellow Pea Flour - 22% Protein | Reduced Protein Yellow Pea Flour - 14% Protein |
|---|---|---|---|
| Native Tapioca Flour | 2.1 | 2.1 | 2.1 |
| Experimental Flour | 9.5 | 9.5 | 9.5 |
| Salt | 1.3 | 1.3 | 1.3 |
| Sodium Bicarbonate | 0.4 | 0.4 | 0.4 |
| Dextrose | 0.4 | 0.4 | 0.4 |
| Total Solids | 39.0 | 39.0 | 39.0 |
| Water | 61.0 | 61.0 | 61.0 |
| Total | 100.0 | 100.0 | 100.0 |

[1]HOMECRAFT ™ Create 860 Rice Flour, Ingredion Incorporated
[2]HOMECRAFT ™ 330 Tapioca Flour, Ingredion Incorporated Batter (Dry Basis):

| Ingredients | All Purpose Wheat Flour - 10% Protein | Regular Yellow Pea Flour - 22% Protein | Reduced Protein Yellow Pea Flour - 14% Protein |
|---|---|---|---|
| Native Rice Flour | 38.1 | 38.1 | 38.1 |
| Heat-Moisture Treated Rice Flour[1] | 10.8 | 10.8 | 10.8 |
| Thermally Inhibited Tapioca Flour[2] | 16.2 | 16.2 | 16.2 |
| Native Tapioca Flour | 5.4 | 5.4 | 5.4 |
| Experimental Flour | 24.3 | 24.3 | 24.3 |
| Salt | 3.2 | 3.2 | 3.2 |
| Sodium Bicarbonate | 1.1 | 1.1 | 1.1 |
| Dextrose | 0.9 | 0.9 | 0.9 |
| Total Solids | 100.0 | 100.0 | 100.0 |

[1]HOMECRAFT ™ Create 860 Rice Flour, Ingredion Incorporated
[2]HOMECRAFT ™ 330 Tapioca Flour, Ingredion Incorporated Sample Preparation Procedure:
1. Wash and peel sweet potatoes.
2. Cut sweet potatoes into ⅜" inch strips with a Keen cutter.
3. Blanch sweet potatoes in 190° F. water in a pot or kettle for 3 minutes.
4. Dry sweet potatoes in a standard oven @ 180° F. or convection type oven at 140° F. to a 10-12% loss.
5. Mix Batter:
    a. Weigh water @ 35-40° F.
    b. Add batter mix to water in a Kitchen Aid mixer. Mix for 10 minutes. Record temp. (Target=55° F.)
    c. Using a Stein Cup* viscosity measurement device, the viscosity should measure 9-10 seconds top to break.
6. Batter the potatoes: dip strips in bowl of batter, strain for 15 seconds on a bakers cooling rack, and throw into the hot oil.
7. Par fry at 375° F. in vegetable oil, for 55-60 seconds.
8. Freeze overnight at −10° F. before reconstitution.
9. Reconstitute by frying in vegetable oil @ 355-365° F., for 2 min 30 sec or
10. Reconstitute by baking @ 400° F. for 20-22 minutes.

Evaluation Method:
Sensory evaluation with focus on crispiness, holding time and surface morphology by panel.

Results:

| Attribute | All Purpose Wheat Flour - 10% Protein | Regular Yellow Pea Flour - 22% Protein | Reduced Protein Yellow Pea Flour - 14% Protein |
|---|---|---|---|
| Crispiness - 5 minutes (1 = worst, 5 = best) | 1.2 | 2.5 | 3.5 |
| Crispiness - 10 minutes (1 = worst, 5 = best) | 1.5 | 3.0 | 4.0 |
| Comments | Limited crispiness, slight toughness. Adhesion is limited. | Slightly crisp. Toughness sl. apparent. Good overall adhesion. | Significant crispiness during chewing. Toughness not apparent. Good overall adhesion. |

Results and Conclusion:

Sensory evaluation on the three samples showed that after holding the fries and evaluating the texture at 5 and 10 minutes, reduced protein pea flour had the highest score in crispiness among the experiment variables. Therefore, the conclusion was that the reduced protein pea flour provided a crispiness enhancement benefit compared to all-purpose wheat flour and regular pea flour in sweet potato fries.

Example 2

The following example demonstrates that reduced protein legume flours provided enhanced crispiness compared to regular legume flours and all-purpose wheat flour when used in a coating formulation for potato fries.

Four sets of legume flours were tested in this experiment: yellow pea flour, faba bean flour, yellow lentil flour and chickpea flour. The following table summarized the protein contents of the regular vs. the reduced protein flours tested in this experiment:

Protein Content of Regular vs. Reduced Protein Flours

| Ingredient | Regular | Reduced Protein |
|---|---|---|
| Yellow Pea Flour | 22% | 14% |
| Faba Bean Flour | 29% | 20% |
| Yellow Lentil Flour | 21% | 15% |
| Chickpea Flour | 20% | 13% |

Formulations:
Batter (Wet Basis):

| Ingredients | All Purpose Wheat Flour - 10% Protein | Yellow Pea Flour - 22% Protein | Yellow Pea Flour - 14% Protein | Faba Bean Flour - 29% Protein | Faba Bean Flour - 20% Protein |
|---|---|---|---|---|---|
| Native Rice Flour | 14.8 | 14.8 | 14.8 | 14.8 | 14.8 |
| Heat-Moisture Treated Rice Flour[1] | 4.2 | 4.2 | 4.2 | 4.2 | 4.2 |
| Thermally Inhibited Tapioca Flour[2] | 6.3 | 6.3 | 6.3 | 6.3 | 6.3 |
| Native Tapioca Flour | 2.1 | 2.1 | 2.1 | 2.1 | 2.1 |
| Experimental Flour | 9.5 | 9.5 | 9.5 | 9.5 | 9.5 |
| Salt | 1.3 | 1.3 | 1.3 | 1.3 | 1.3 |
| Sodium Bicarbonate | 0.4 | 0.4 | 0.4 | 0.4 | 0.4 |
| Dextrose | 0.4 | 0.4 | 0.4 | 0.4 | 0.4 |
| Total Solids | 39.0 | 39.0 | 39.0 | 39.0 | 39.0 |
| Water | 61.0 | 61.0 | 61.0 | 61.0 | 61.0 |
| Total | 100 | 100 | 100 | 100 | 100 |

[1]HOMECRAFT ™ Create 860 Rice Flour, Ingredion Incorporated
[2]HOMECRAFT ™ 330 Tapioca Flour, Ingredion Incorporated

| Ingredients | All Purpose Wheat Flour - 10% Protein | Yellow Lentil Flour - 21% Protein | Yellow Lentil Flour - 15% Protein | Chickpea Flour - 20% Protein | Chickpea Flour - 13% Protein |
|---|---|---|---|---|---|
| Native Rice Flour | 14.8 | 14.8 | 14.8 | 14.8 | 14.8 |
| Heat-Moisture Treated Rice Flour[1] | 4.2 | 4.2 | 4.2 | 4.2 | 4.2 |
| Thermally Inhibited Tapioca Flour[2] | 6.3 | 6.3 | 6.3 | 6.3 | 6.3 |
| Native Tapioca Flour | 2.1 | 2.1 | 2.1 | 2.1 | 2.1 |
| Experimental Flour | 9.5 | 9.5 | 9.5 | 9.5 | 9.5 |
| Salt | 1.3 | 1.3 | 1.3 | 1.3 | 1.3 |
| Sodium Bicarbonate | 0.4 | 0.4 | 0.4 | 0.4 | 0.4 |
| Dextrose | 0.4 | 0.4 | 0.4 | 0.4 | 0.4 |
| Total Solids | 39.0 | 39.0 | 39.0 | 39.0 | 39.0 |
| Water | 61.0 | 61.0 | 61.0 | 61.0 | 61.0 |
| Total | 100 | 100.0 | 100.0 | 100.0 | 100.0 |

[1]HOMECRAFT ™ Create 860 Rice Flour, Ingredion Incorporated
[2]HOMECRAFT ™ 330 Tapioca Flour, Ingredion Incorporated Batter (Dry Basis):

| Ingredients | All Purpose Wheat Flour - 10% Protein | Yellow Pea Flour - 22% Protein | Yellow Pea Flour - 14% Protein | Faba Bean Flour - 29% Protein | Faba Bean Flour - 20% Protein |
|---|---|---|---|---|---|
| Native Rice Flour | 38.1 | 38.1 | 38.1 | 38.1 | 38.1 |
| Heat-Moisture Treated Rice Flour[1] | 10.8 | 10.8 | 10.8 | 10.8 | 10.8 |
| Thermally Inhibited Tapioca Flour[2] | 16.2 | 16.2 | 16.2 | 16.2 | 16.2 |
| Native Tapioca Flour | 5.4 | 5.4 | 5.4 | 5.4 | 5.4 |
| Experimental Flour | 24.3 | 24.3 | 24.3 | 24.3 | 24.3 |
| Salt | 3.2 | 3.2 | 3.2 | 3.2 | 3.2 |
| Sodium Bicarbonate | 1.1 | 1.1 | 1.1 | 1.1 | 1.1 |
| Dextrose | 0.9 | 0.9 | 0.9 | 0.9 | 0.9 |
| Total | 100.0 | 100.0 | 100.0 | 100.0 | 100.0 |

[1]HOMECRAFT ™ Create 860 Rice Flour, Ingredion Incorporated
[2]HOMECRAFT ™ 330 Tapioca Flour, Ingredion Incorporated

| Ingredients | All Purpose Wheat Flour - 10% Protein | Yellow Lentil Flour - 21% Protein | Yellow Lentil Flour - 15% Protein | Chickpea Flour - 20% Protein | Chickpea Flour - 13% Protein |
|---|---|---|---|---|---|
| Native Rice Flour | 38.1 | 38.1 | 38.1 | 38.1 | 38.1 |
| Heat-Moisture Treated Rice Flour[1] | 10.8 | 10.8 | 10.8 | 10.8 | 10.8 |
| Thermally Inhibited Tapioca Flour[2] | 16.2 | 16.2 | 16.2 | 16.2 | 16.2 |
| Native Tapioca Flour | 5.4 | 5.4 | 5.4 | 5.4 | 5.4 |
| Experimental Flour | 24.3 | 24.3 | 24.3 | 24.3 | 24.3 |
| Salt | 3.2 | 3.2 | 3.2 | 3.2 | 3.2 |
| Sodium Bicarbonate | 1.1 | 1.1 | 1.1 | 1.1 | 1.1 |
| Dextrose | 0.9 | 0.9 | 0.9 | 0.9 | 0.9 |
| Total | 100.0 | 100.0 | 100.0 | 100.0 | 100.0 |

[1]HOMECRAFT ™ Create 860 Rice Flour, Ingredion Incorporated
[2]HOMECRAFT ™ 330 Tapioca Flour, Ingredion Incorporated Sample Preparation Procedure:
1. Wash and peel potatoes.
2. Cut potatoes into ⅜" inch strips with a Keen cutter.
3. Blanch potatoes in 170° F. water in a Groen kettle for approx. 8 minutes.
4. Dip 30 seconds in 160° F. solution with 0.7% SAPP, 2.0% salt, and 0.4% dextrose.
5. Dry potatoes in a standard oven @ 180° F. or convection type oven at 140° F. to a 10-12% loss.
6. Mix Batter:
   a. Weigh water @ 35-40° F.
   b. Add batter mix to water in a Kitchen Aid mixer. Mix for 10 minutes. Record temp. (Target=55° F.)
   c. Using a Stein Cup* viscosity measurement device, the viscosity should measure 9-10 seconds top to break.
7. Batter the potatoes: dip strips in bowl of batter, strain for 15 seconds on a bakers cooling rack, and throw into the hot oil.
8. Par fry at 375° F. in vegetable oil, for 55-60 seconds
9. Freeze overnight at −10° F. before reconstitution.
10. Reconstitute by frying in vegetable oil @ 355-365° F., for 2 minutes 30 seconds or
11. Reconstitute by baking @ 400° F. for 20-22 minutes.

Evaluation Method:
Sensory evaluation with focus on crispiness, holding time and surface morphology by panel.

| Attribute | All Purpose Wheat Flour - 10% Protein | Yellow Pea Flour - 22% Protein | Yellow Pea Flour - 14% Protein | Faba Bean Flour - 29% Protein | Faba Bean Flour - 20% Protein |
|---|---|---|---|---|---|
| Crispiness - 5 minutes (1 = worst, 5 = best) | 1.2 | 2.6 | 3.5 | 2.5 | 3.7 |
| Crispiness - 10 minutes (1 = worst, 5 = best) | 1.5 | 3.2 | 4.0 | 3.0 | 4.0 |
| Comments | Limited crispiness, slight toughness. Adhesion is limited. | Slightly crispy. Toughness slightly apparent. Good overall adhesion. | High level of crispiness during chewing. Toughness not apparent. Good overall adhesion. | Slightly crispy. Toughness slightly apparent. Good overall adhesion. | High level of crispiness during chewing. Toughness not apparent. Good overall adhesion. |

| Attribute | All Purpose Wheat Flour - 10% Protein | Yellow Lentil Flour - 21% Protein | Yellow Lentil Flour - 15% Protein | Chickpea Flour - 20% Protein | Chickpea Flour - 13% Protein |
|---|---|---|---|---|---|
| Crispiness - 5 minutes (1 = worst, 5 = best) | 1.2 | 2.3 | 3.2 | 2.0 | 3.2 |
| Crispiness - 10 minutes (1 = worst, 5 = best) | 1.5 | 2.7 | 3.7 | 1.8 | 3.5 |
| Comments | Limited crispiness, slight toughness. Adhesion is limited. | Slightly crispy. Toughness slightly apparent. Good overall adhesion. | Moderate to high crispiness during chewing. Toughness not apparent. Good overall adhesion. | Limited crispiness Toughness slightly apparent. Acceptable overall adhesion. | Moderate crispiness during chewing. Toughness not apparent. Acceptable overall adhesion. |

Results and Conclusion:

Sensory evaluation on the potato fry samples showed that after holding the fries and evaluating the texture at 5 and 10 minutes, reduced protein legume flours scored higher in crispiness than the regular legume flours. In addition, they scored much higher than all-purpose wheat flour. Therefore, it was concluded that reducing the protein level of legume flours by 6-9% provides an unexpected crispiness enhancement benefit in potato fries. It is expected that a further reduction in protein content in the flours would further enhance the benefit.

While particular embodiments of the present invention have been illustrated and described, it would be obvious to those skilled in the art that various other changes and modifications can be made without departing from the spirit and scope of the application. It is therefore intended to cover in the appended claims all such changes and modifications that are within the scope of this application.

What is claimed is:

1. A dry solids coating composition comprising separately by weight:
   a) from about 25% to about 50% by weight of a native rice flour;
   b) from about 5% to about 15% by weight of a rice flour which has been heat-moisture treated;
   c) from about 10% to about 20% by weight of a flour which has been thermally inhibited; and
   d) from about 15% to about 35% by weight of a reduced protein base pulse flour having a weight reduction in protein content compared to the protein content of a native base pulse flour of from about 20% to about 40% by weight;
   wherein the reduced protein base pulse flour has a protein content of from about 13% to about 20% by weight of the flour and a starch content of between 58.0 and 76.1% starch;
   wherein base pulse flour is selected from the group consisting of pea flour, faba bean flour, lentil flour, chickpea flour, and mixtures thereof;
   and wherein the reduced protein base pulse flour is made by a process comprising milling a pulse to from a milled pulse composition and air classifying the components of the milled pulse composition to obtain the reduced protein base pulse flour.

2. The composition of claim 1, wherein the reduced protein base pulse flour has a protein content of from about 12% to about 16% by weight of the flour.

3. The composition of claim 1, wherein the flour which has been thermally inhibited is derived from the group consisting of tapioca, corn, sorghum, potato, and wheat.

4. The composition of claim 1, wherein the flour which has been thermally inhibited is derived from tapioca.

5. An aqueous enrobing solution comprising the dry solids coating composition of claim 1 in a ratio of about 1.2 parts to about 1.6 parts by weight of water to 1 part by weight of the dry solids coating composition of claim 1.

6. A process for preparing a frozen potato product with a film-like coating on the outer surface, which comprises cutting raw potatoes; blanching the potatoes; partially drying the potatoes; coating the potatoes with the aqueous enrobing composition of claim 5; followed by par frying the potatoes in hot oil; and freezing the potatoes.

7. An enrobed potato product prepared with the enrobing solution of claim 5 and a potato product.

8. The enrobed potato product of claim 7, wherein the enrobed potato product comprises sweet potato.

9. The enrobed potato product of claim 7, wherein the enrobed potato product is then par fried.

10. The enrobed potato product of claim 7, wherein the enrobed potato product is then frozen.

11. The enrobed potato product of claim 7, wherein the enrobed potato product is then baked.

12. The enrobed potato product of claim 7, wherein the enrobed potato product is then, in any sequence, par fried, frozen, and baked.

13. A dry solids coating composition comprising separately by weight:
   a) from about 35% to about 40% by weight of a native rice flour;
   b) from about 7% to about 15% by weight of a rice flour which has been heat-moisture treated;
   c) from about 12% to about 20% by weight of a tapioca flour which has been thermally inhibited; and
   d) from about 20% to about 30% by weight of a reduced protein base pulse flour, wherein the base pulse flour is selected from the group consisting of pea flour, faba bean flour, lentil flour, chickpea flour, and mixtures thereof;
   wherein the reduced protein base pulse flour has a weight reduction in protein content compared to the protein content of a native base pulse flour of from about 20% to about 40% by weight;
      wherein the reduced protein base pulse flour has a protein content of from about 13% to about 20% by weight of the flour and a starch content of between 58.0 and 76.1% starch;
      and wherein the reduced protein base pulse flour is made by a process comprising providing a pulse composition comprising a plurality of separate protein particles and a plurality of starch particles having adhered protein and separating the protein particles from the starch particles having adhered protein.

* * * * *